April 5, 1966  J. R. HANNER  3,244,372
AUTOMATIC SENSING AND CONTROL WATER VALVE APPARATUS
Filed Oct. 12, 1964  2 Sheets-Sheet 1
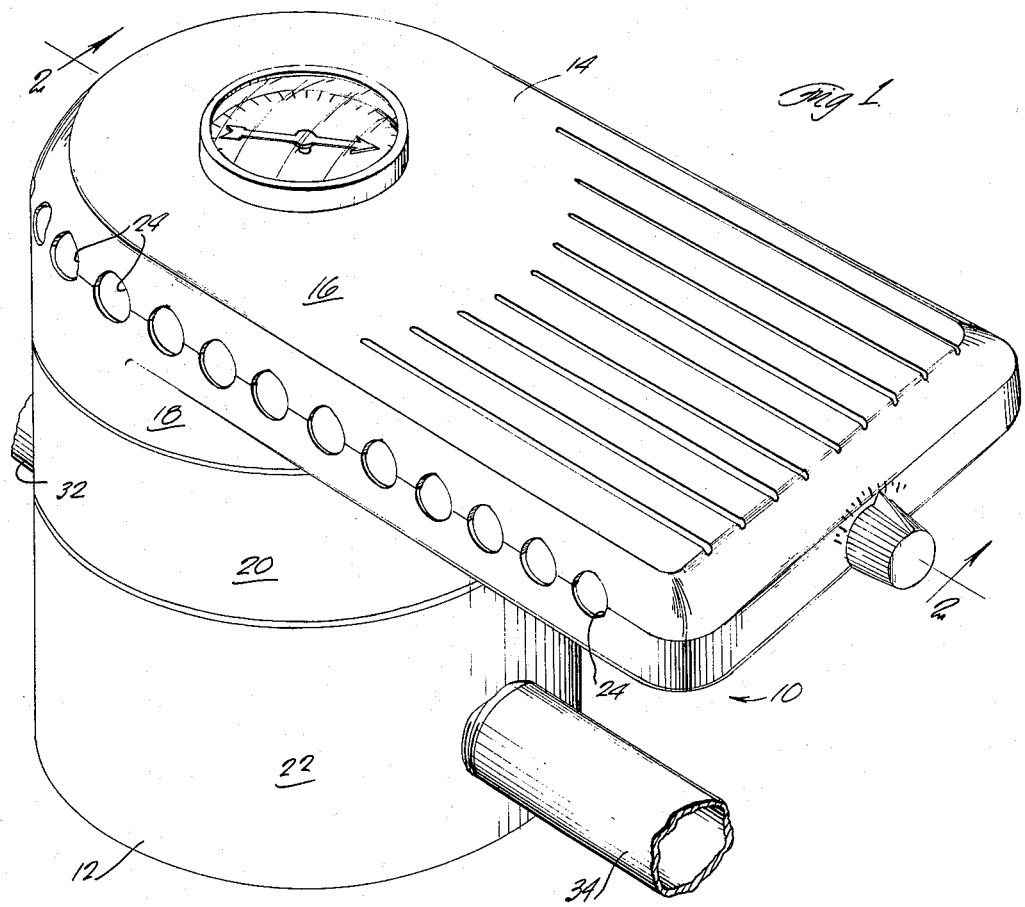
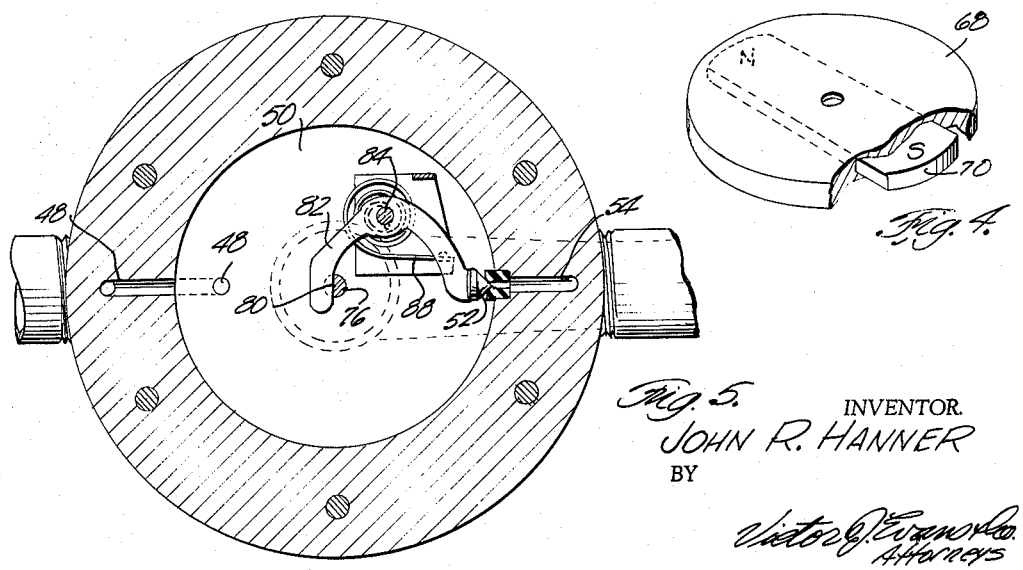
INVENTOR.
JOHN R. HANNER
BY April 5, 1966 J. R. HANNER 3,244,372
AUTOMATIC SENSING AND CONTROL WATER VALVE APPARATUS
Filed Oct. 12, 1964 2 Sheets-Sheet 2
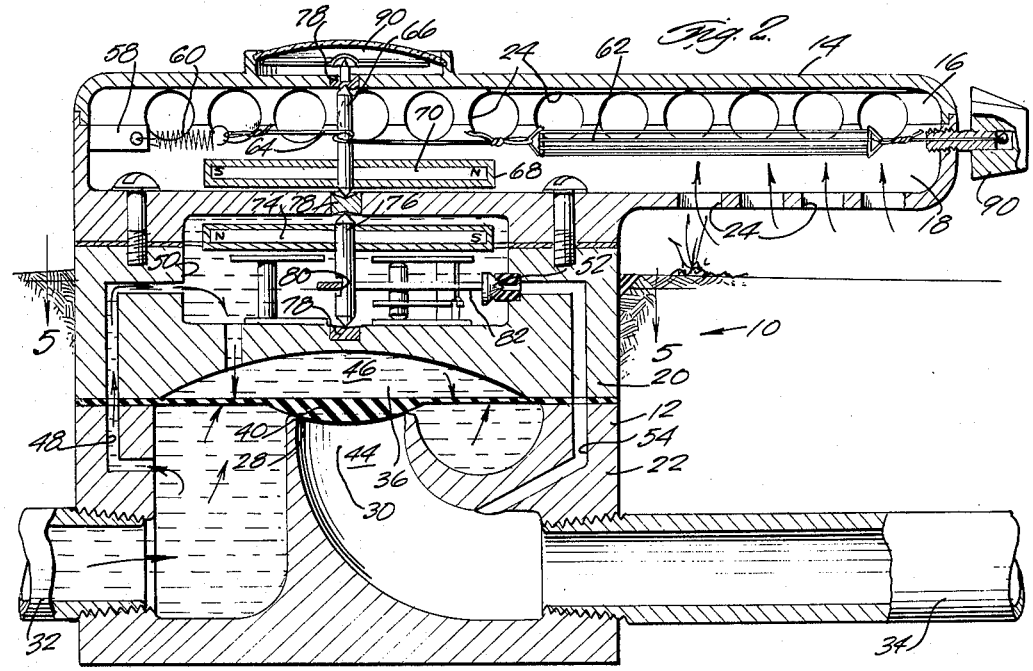
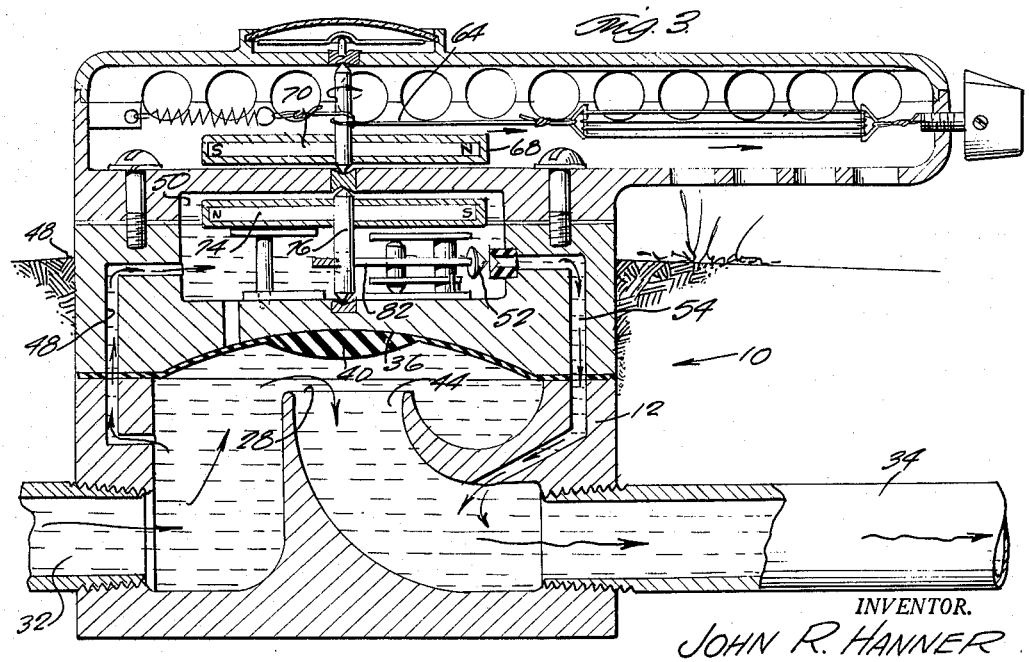
INVENTOR.
JOHN R. HANNER

United States Patent Office 3,244,372
Patented Apr. 5, 1966

3,244,372
AUTOMATIC SENSING AND CONTROL WATER VALVE APPARATUS
John R. Hanner, 2630 Michigan, Dallas, Tex.
Filed Oct. 12, 1964, Ser. No. 403,093
5 Claims. (Cl. 239—63)

The invention relates to an improved automatic sensing and control water valve apparatus for providing accurate control of water or water-soaking systems such as used on lawns, golf courses, irrigated fields, and truck gardens, and the like, and more particularly the invention relates to providing a main valve and a control valve therefor which cooperate to control the discharge of water from the main valve upon a decreased condition of relative humidity, and for closing the valve upon a given increase of relative humidity, as well as providing isolation couplings between the sensing apparatus and the control valve of the apparatus.

The invention seeks to provide an automatic control and sensing apparatus for water valves in which no source of power, such as electricity or other sources, is required to operate the components of the system, and the system is completely automatic and responsive to substantial drops in humidity for opening the valve, and responsive to substantial increases in humidity for closing the valve.

Therefore, an object of the invention is to provide a system for providing close control of water being dispensed from sprinkler or soaker systems, and includes the advantage of easy installation.

Another advantage of the invention is that it includes the object of providing means for visible indication of the relative humidity that is used to control the control valve.

A further object of the invention is to provide an automatic control apparatus that is subject to low maintenance costs, is portable, and readily accessible as well as being completely automatic throughout.

Another object of the invention is to provide an irrigation or water dispensing control system completely independent of electric systems and in which the mechanism is isolated from the relative humidity sensing apparatus.

The accompanying drawings illustrate a presently preferred embodiment of the invention, but intended only as an example and not as a limitation thereof. In the drawings:

FIGURE 1 is a perspective view of the automatic sensing and control water valve apparatus of the present invention;

FIGURE 2 is a vertical cross-sectional view taken along lines 2—2 of FIGURE 1 in which the main valve is closed, and in which the valve section of the apparatus is installed underground while the sensing apparatus is installed aboveground;

FIGURE 3 shows a vertical cross-sectional view of the apparatus in which the main control valve is open in accordance with the operation of the preferred embodiment of the invention;

FIGURE 4 shows a component of the sensing apparatus in which there is a plastic disc embedded with a magnet for providing the isolation coupling between the relative humidity component and the control valve apparatus;

FIGURE 5 is a cross-sectional view taken along lines 5—5 of FIGURE 2 showing a detailed plan view of the control valve in the control valve chamber.

Referring now to the drawings, there is shown automatic sensing and control water valve apparatus 10 having a cylindrically disposed valve body 12 which is substantially entirely embedded in the ground as shown in FIGS. 2 and 3, and a sensing housing 14 having its upper portion of a generally rectangular configuration. The apparatus 10 may comprise at least four castings 16, 18, 20, 22 which may be constructed of castings of aluminum, brass, or even a plastic material, or any other material that is non-magnetic in character. The sensing housing has apertures 24, 24 for providing throughout the housing thereof, complete and thorough ventilation on all sides, as well as the bottom thereof.

In the valve body 12, there is the valve 28 positioned and centrally located in a conduit 30 for the passage of water therethrough, and in which the valve, which is the main valve, divides the conduit into an inlet side 32 and an outlet side 34, and in which there is also provided with the valve 28 a valve head chamber 36.

A diaphragm 40 constructed of rubber or neoprene is positioned in the main valve head chamber 36 and divides the valve head chamber into a low pressure side 44, and a high pressure side 46, and communication is provided between each side of the diaphragm by a bore 48. The bore, therefore, extends from the inlet side 32 to the high pressure side 46 through a control chamber 50. The control chamber fills with water from the conduit under the influence of the high pressure side, and the control chamber is provided with a control valve 52 in which the outlet side 54 of the control valve communicates with the low pressure side 44 of the valve 28.

In the sensing housing 14, there is a temperature sensing strip 58, a spring 60, and a humidity responsive element 62, the humidity responsive element comprising moisture sensitive elements, and are connected in series with the spring and the temperature sensing strip 58 so that there is developed in the wire 64 an indication of the relative humidity of the environment surrounding the sensing housing 14. As the valve body is shown implanted in the ground, and the sensing housing exposed, the wire 64 provides an accurate indication of the relative humidity. Where the ground is substantially dry and arid, the wire 64 will indicate the dryness by the relative humidity component of the sensing system. The wire 64 is wrapped around a shaft 66 which is rotated by changes in the relative humidity. Secured to the shaft 66 is a plastic disc 68 having embedded therein a magnet 70. The disc 68 is securely affixed to the shaft 66 so that rotation thereof caused by the change in relative humidity rotates the disc 68 and also the magnet 70 embedded therein. The magnet 70 is shown having north and south poles, and is shown in particular detail in FIG. 4.

The relative position of the magnet 70 is sensed and followed by the oppositely oriented and co-axially mounted magnet 74 which is similarly rotated upon a shaft 76 which is in the control chamber 50. The shaft 76 is vertically mounted in the control chamber and each of the ends is pointed as shown in FIGS. 2 and 3 so that they may rotate without having to overcome the force due to friction, and they are mounted in a seal or disc 78, 78.

The shaft 76 has a flat portion 80 intermediate the length thereof so that any rotation of the shaft from the position shown in FIGS. 2 and 5 in either a clockwise or counterclockwise direction will displace a lever arm 82 about its shaft 84 to open the valve 52. A bias spring 88 is mounted for providing normal closure of the valve 52. It is seen, therefore, that rotation of the shaft 76 in response to displacement of the magnet 74 upon its following the magnet 70 which is displaced by rotation of the shaft 66 in response to the relative humidity means 58, 60, 62, will open the valve 52 and provide thereby a bleeder path through bore 54 from the high pressure side 46 to the low pressure side 44 of the valve 28. In this way, the diaphragm 40 is caused to be unseated from the valve by the drop in pressure between the high side 46 and the low side 44 so that the dome of the diaphragm 40 is raised to open the main line in the conduit 32.

Thus, a full stream of water passes through the valve upon the sensing apparatus determining that the atmosphere has reached a preselected low relative humidity point. A calibration knob 90 is provided for making slight or corrective adjustments to the sensing apparatus 58, 60, 62. Thus by a preselected relative humidity characteristic, the sensing element 58–62 will become longer upon increased relative humidity and shaft 66 will then rotate back to an original position which will rotate shaft 66 to its original position so that the lever arm 82 engages the flat portion 80 of the shaft, and the valve stem of the valve 50 repositions the valve to its closed position. Thus the water is shut off, resulting from a relatively increased pressure in pressure side 46 compared with that of 44, and the main flow through the valve 28 is shut off.

An indicator 90 may be provided in the top portion of the sensing housing 14 and may be preferably mounted coaxially with the shaft 66, 76. The indicator 90 is essentially a magnet in a disc arrangement such as shown in FIG. 4 in which the magnet operates in opposition to the relative position of the magnet 70, as has been described above with reference to magnet 70 and 74. Thus it is seen that an improved and automatic sensing and control water valve unit is provided that is completely and accurately automatically responsive to changes in relative humidity for actuating a water valve unit.

While there have been illustrated certain details of construction and particular arrangements of parts, the invention is not limited to these details except as defined in the appended claims, and particularly the invention is not limited to the particular form of water control valve used herein or to the particular type of sensing elements.

What is claimed is:

1. An automatic sensing and control water valve apparatus comprising a conduit for water, a main valve dividing said conduit into an inlet side and an outlet side and having a valve head chamber, a diaphragm dividing said head chamber into a low pressure side in communication with said outlet side and a high pressure side in communication with said inlet side by a bore extending from the inlet side to said high pressure side, a control chamber in communication with said bore having a control valve head and valve stem, the outlet side of said control valve being in communication with said low pressure side, a sensing housing having a temperature responsive element and a humidity responsive element interconnected to provide an indication of relative humidity, means responsive to said indication of relative humidity for closing said control valve upon increased humidity and for opening said control valve upon decreased humidity to form a bleeder path for said high pressure side to said low pressure side and thus open said main valve until a given increased humidity is achieved and indicated by said relative humidity means when the bleeder path is cut off and the main valve is then closed.

2. The invention of claim 1 wherein isolation coupling means comprise rotatable pivotally mounted magnets provided for coupling the changes in humidity indication to said control valve.

3. The invention of claim 1 wherein an indicator means is positioned in responsive relation to said relative humidity means, and is coupled thereto by a permanent magnet means.

4. An automatic sensing and control water valve apparatus comprising a conduit for water, a main valve dividing said conduit into an inlet side and an outlet side and having a valve head chamber, a diaphragm dividing said head chamber into a low pressure side in communication with said outlet side and a high pressure side in communication with said inlet side by a bore extending from the inlet side to said high pressure side, a control chamber in communication with said bore having a control valve head and valve stem, the outlet side of said control valve being in communication with said low pressure side, a rotatably mounted disc having a permanent magnet radially mounted and imbedded therein, a shaft for mounting the disc in said control chamber and said shaft having a lever actuating portion thereof, a lever means connected between the lever actuation portion of said shaft and the control valve stem for opening the control valve when said disc is displaced, bias means for returning the disc to a given predetermined position, a sensing housing having a temperature responsive element and a humidity responsive element inter-connected to provide an indication of relative humidity, a second disc having a permanent magnet mounted and imbedded therein, said second disc being axially aligned and cooperatively positioned in communication with said first disc so that displacement of the second disc upon changes in relative humidity affects and communicates said displacement to the first disc for opening the control valve upon decreased humidity to form a bleeder path for said high pressure side to said low pressure side and thus open said main valve until a given increased humidity is achieved when the bleeder path is cut off and the main valve is closed.

5. The invention of claim 4 wherein a third rotatably mounted disc is provided in coaxial relation to said first two discs and having a permanent magnet imbedded therein for providing an indication of the relative humidity indicative of said displacement of the second disc.

No references cited.

EVERETT W. KIRBY, *Primary Examiner.*